(No Model.)

F. E. FISHER.
ELECTRIC MOTOR.

No. 360,216. Patented Mar. 29, 1887.

Witnesses
Edward A. Gott
Summer Collins

Inventor
Frank E. Fisher
by Geo. H. Lothrop
his Atty.

UNITED STATES PATENT OFFICE.

FRANK E. FISHER, OF DETROIT, MICHIGAN.

ELECTRIC MOTOR.

SPECIFICATION forming part of Letters Patent No. 360,216, dated March 29, 1887.

Application filed January 11, 1886. Serial No. 188,239. (No model.)

*To all whom it may concern:*

Be it known that I, FRANK E. FISHER, of Detroit, in the county of Wayne and State of Michigan, have invented a new and useful Improvement in Electric Motors, of which the following is a specification.

My invention consists in an improvement in electric motors, hereinafter fully pointed out and described.

Figure 2:
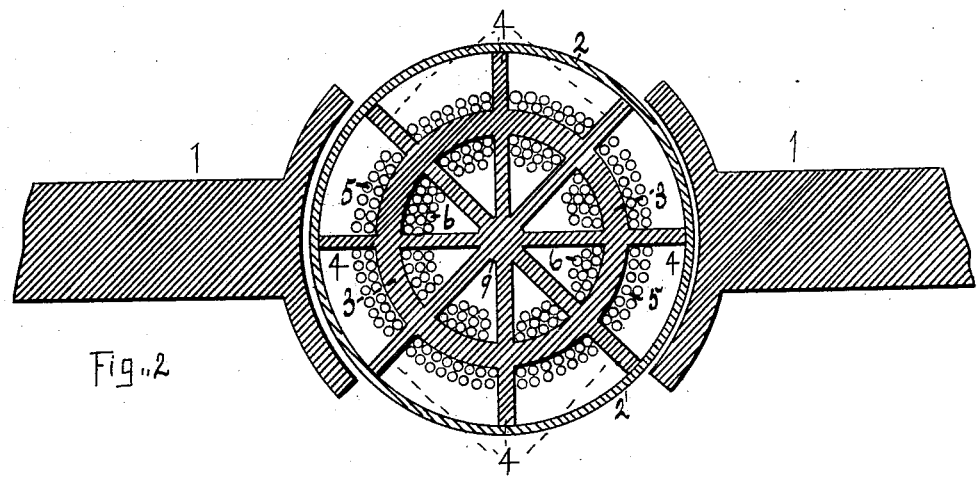
Figure 1:
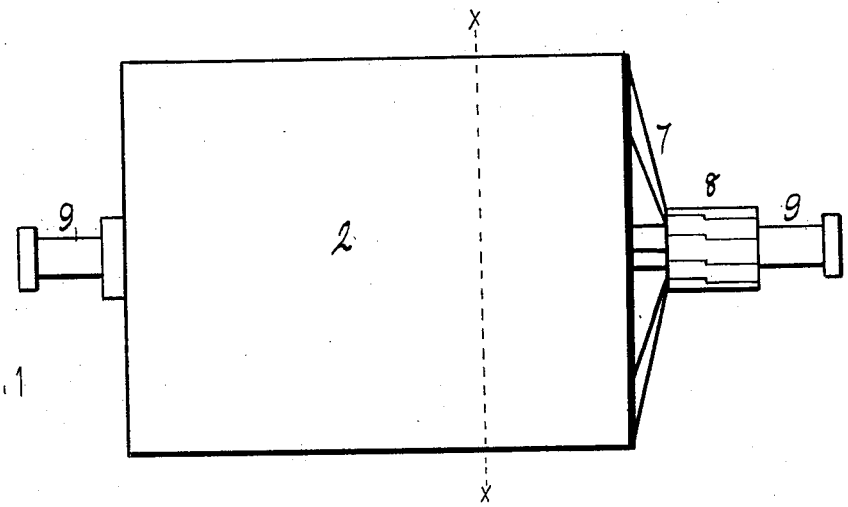

Figure 1 is a side elevation of the complete armature; and Fig. 2, a section on the line $x\ x$, Fig. 1, with the pole-pieces of the magnet also in section.

1 1 represent the pole pieces of an electro-magnet, between which the armature rotates, as usual.

3 represents a ring-armature, supported on an armature-shaft, 9, and wound, in the usual manner, with coils of insulated wire, 5 representing the outer layer of the coils.

8 represents a commutator, made in the usual manner, mounted on the armature-shaft.

The magnets, armature, commutator, connection of the armature-coils with the commutator, the commutator-brushes, and the arrangement of the circuit are all of any ordinary well-known type, and I do not deem detailed illustration or description thereof necessary.

4 4 represent soft-iron studs projecting from the armature-ring between each of the coils thereon, and 2 represents a ring of magnetic metal which surrounds the armature and is in contact with the studs 4. It may be secured to the armature in any convenient manner.

7 represents the connection of the armature-coils with the commutator.

It will be observed that the neutral point of the armature remains constant, or practically so, with relation to a fixed point. So long as that is so the particular construction of the armature is immaterial.

I usually make the shield of sheet-iron, using somewhat heavier iron for large armatures than for small ones. When the current is passing, the whole exterior of the armature, except at its neutral point, is magnetized, the magnetism being strongest at the poles and equally distributed on both sides, gradually losing its strength toward the neutral point. If the shield be omitted and the armature constructed in any known manner, the surface of the armature which is covered by wire is not magnetized to any appreciable extent, and the force of the magnet is exerted on the iron armature beneath the wire, or on projecting studs.

In a Gramme ring-armature the iron ring cannot be brought close to the poles of the field-magnet, and the greater the depth of wire the greater the distance, thus reducing very rapidly the effective power of the magnet.

Where the armature is provided with projecting studs, as in the drawings, the pull of the field-magnet is practically all exerted upon the studs, and the space between the studs, which is occupied by the wire, is of little value. Again, the rotation of the armature between the poles of the magnet generates a reactionary current in the armature, which decreases the efficiency of the machine. This is practically obviated by my invention, as the metallic shield between the wire and field-magnet renders it practically impossible for the coils of the wire to cut the lines of force of a field-magnet. This permits the field-magnet to be made of great power, because an increase in the power of the magnet does not cause an increase of the counter electro-motive force.

What I claim as my invention, and desire to secure by Letters Patent, is—

1. In an electro-motor having an armature whose neutral point remains constant, or practically so, with relation to a fixed point, a magnetic shield interposed between the armature and poles of the field-magnets, substantially as described.

2. In an electric motor, an armature having a continuous periphery, within which are all the coils, substantially as shown and described.

3. In an electric motor, an armature having a continuous outer magnetic surface, substantially as and for the purposes set forth.

FRANK E. FISHER.

Witnesses:
SUMNER COLLINS,
C. M. MASON.